(12) United States Patent
Li

(10) Patent No.: US 8,888,297 B2
(45) Date of Patent: Nov. 18, 2014

(54) POLARIZED LIGHT SOURCE AND POLARIZATION CONVERTING METHOD AND DEVICE THEREOF

(75) Inventor: Yi Li, Pleasanton, CA (US)

(73) Assignee: Appotronics Corporation Limited, Shenzhen (CN)

( * ) Notice: Subject to any disclaimer, the term of this patent is extended or adjusted under 35 U.S.C. 154(b) by 252 days.

(21) Appl. No.: 13/376,581

(22) PCT Filed: Jun. 22, 2010

(86) PCT No.: PCT/CN2010/000911
§ 371 (c)(1),
(2), (4) Date: Dec. 6, 2011

(87) PCT Pub. No.: WO2010/142144
PCT Pub. Date: Dec. 16, 2010

(65) Prior Publication Data
US 2012/0075589 A1  Mar. 29, 2012

(30) Foreign Application Priority Data

Jun. 12, 2009 (CN) .......................... 2009 1 0107970

(51) Int. Cl.
| G03B 21/14 | (2006.01) |
|---|---|
| F21V 9/16 | (2006.01) |
| G02B 26/00 | (2006.01) |
| G02B 27/28 | (2006.01) |
| G03B 21/20 | (2006.01) |
| H04N 9/31 | (2006.01) |

(52) U.S. Cl.
CPC ............ *G02B 26/008* (2013.01); *G02B 27/286* (2013.01); *G03B 21/204* (2013.01); *G03B 21/2073* (2013.01); *H04N 9/3114* (2013.01); *H04N 9/3167* (2013.01)
USPC .............................................. 353/84; 362/84

(58) Field of Classification Search
USPC .................. 353/84, 20, 30, 31; 359/885–892; 313/483, 501; 362/84, 231
See application file for complete search history.

(56) References Cited

U.S. PATENT DOCUMENTS

2002/0176146 A1  11/2002  De Vaan
2005/0041163 A1  2/2005  Butler-Smith et al.
(Continued)

FOREIGN PATENT DOCUMENTS

CN  1463556  12/2003
CN  1998246  7/2007
(Continued)

OTHER PUBLICATIONS

Written Opinion in the parent PCT application No. PCT/CN2010/000911, dated Sep. 9, 2010.
(Continued)

*Primary Examiner* — William C Dowling
*Assistant Examiner* — Ryan Howard
(74) *Attorney, Agent, or Firm* — Chen Yoshimura LLP

(57) ABSTRACT

A polarized light source comprises a light emitting source and a polarization conversion device. The polarization conversion device comprises a fixing device (107), and a transparent moveable carrier (104) having motion state with respect to the fixing device (107) and provided with light wavelength conversion material (103). The polarization conversion device further comprises a stationary polarization beam splitter (101) close to the moveable carrier for transmitting a portion of excited light from the light wavelength conversion material (103) to provide a polarized emitted light and reflecting the other portion back to the light wavelength conversion material (103). A filter (102) for reflecting the excited light and transmitting the light from the light emitting source can be disposed at the side of the moveable carrier opposite to the polarization beam splitter (101).

24 Claims, 2 Drawing Sheets

(56) References Cited

U.S. PATENT DOCUMENTS

| | | |
|---|---|---|
| 2005/0237487 A1 | 10/2005 | Chang |
| 2006/0087847 A1* | 4/2006 | Yamanaka .................... 362/277 |
| 2007/0019408 A1 | 1/2007 | McGuire et al. |
| 2007/0146639 A1 | 6/2007 | Conner |
| 2009/0034284 A1 | 2/2009 | Li et al. |

FOREIGN PATENT DOCUMENTS

| | | |
|---|---|---|
| CN | 101271261 | 9/2008 |
| CN | 101361022 | 2/2009 |
| EP | 1599051 | 11/2005 |
| JP | 2007-156270 | 6/2007 |
| JP | 2008-20707 | 1/2008 |
| WO | 2006133214 | 12/2006 |

OTHER PUBLICATIONS

International Search Report in the parent PCT application No. PCT/CN2010/000911, dated Sep. 9, 2010.
IPRP in the parent PCT application No. PCT/CN2010/000911, dated Sep. 9, 2010.
Chinese Office Action, dated Jul. 13, 2011, in a counterpart Chinese patent application, No. CN 200910107970.0.
Chinese Office Action, dated Dec. 21, 2011, in a counterpart Chinese patent application, No. CN 200910107970.0.

* cited by examiner

POLARIZED LIGHT SOURCE AND POLARIZATION CONVERTING METHOD AND DEVICE THEREOF

BACKGROUND OF THE INVENTION

1. Field of the Invention

This invention relates to a polarization conversion method and related devices for a polarized light source, and in particular, it relates to such light sources useful in projection systems.

2. Description of the Related Art

A typical projection system includes a light source device, the light source device including multiple monochromatic light sources, such as and not limited to red, green and blue light sources, to generate red (R), green (G) and blue (B) lights, respectively.

To reduce cost and increase brightness of the output light, conventional light source devices generate multiple monochromatic lights by employing light emitting elements and a wavelength conversion device having wavelength conversion materials. The wavelength conversion materials include phosphor powders, dyes of mano light emitting materials. An example of a wavelength conversion device is a segmented wheel, each segment carrying one or more phosphors. The excitation light from the light emitting element illuminates the rotating wheel to generate converted light (also referred to as exited light) having multiple alternating colors which corresponds to the multiple segments of the wheel carrying different wavelength conversion materials. For example, three-color projection systems often use an excitation light from a blue LED (light emitting diode) to generate desired red, green and blue monochromatic lights.

As is well known, when phosphor materials are excited and generates converted light, the converted light is emitted in all directions substantially uniformly. Conventional light source devices, such as UHP lamps, LEDs, and the wavelength conversion type of light source devices described above all output non-polarized light.

In conventional LCD (liquid crystal display) or LCoS (liquid crystal on silicon) projection systems, because the liquid crystal or the LCoS chip can only use polarized light of a desired polarization for display, only about 50% of the light energy is used by the projection systems. In such display systems, to increase light utilization efficiency, it is desired to convert the non-polarized light from the light source devices into polarized light. Conventional conversion technology typically uses a method shown in FIG. 1:

In FIG. 1, the function of the polarization beam splitter plate 1 is to separate the input non-polarized light beam 41 from a typical light source, by transmission and reflection, into two polarized light beams, namely P light 42 and S light 43. The polarization directions of these two polarized lights are perpendicular to each other. Then, a reflector 2 reflects the S light 43 to a half-wave plate 3, which rotates the polarization direction of the S light 43 by 90 degrees to generate P light 44. Thus, the non-polarized light from the source is converted into polarized light including P light 42 and P light 44.

However, a problem of the above technology is that the size (area) of the light beam is expanded in the polarization conversion process. Although theoretically the energy of the useable polarized light is increased by 2 with this conversion method, the etendue of the output light is also increase by 2. Thus, for the projection system, the brightness (or luminance, defined as the light flux per unit solid angle per unit area) is not increased. In fact, due to losses in the polarization conversion process, the brightness is actually decreased. Because UHP lamps have relatively low etendue, the increase of etendue due to the above polarization conversion and the brightness reduction may not be obvious; but for LED light sources which have relatively large etendue, the impact on the brightness of the projection system can be a problem.

SUMMARY OF THE INVENTION

Accordingly, the present invention is directed to a polarization conversion method and apparatus that substantially obviate one or more of the problems due to limitations and disadvantages of the related art.

An object of the present invention is to provide a polarization conversion method and device useful for light sources, which directly converts the high-brightness output light of the light source into polarized light, to increase the light utilization efficiency of projection systems.

Embodiments of the present invention improve conventional technology in the following way. Existing light sources that use a rotating wheel carrying wavelength conversion materials has improved power and brightness of the output light, but existing polarization beam splitter can only separate light in one dimension. If a polarization beam splitter is disposed on the rotating wheel and rotates with it, the direction of the output linearly polarized light will also vary with time, and as a result it is unable to output a stable linearly polarized light. To improve upon such a system, embodiments of the present invention provide a stationary reflection-type polarization beam splitter plate which is disposed in the output path of the converted light and does not rotate with the wheel. The converted light from the wavelength conversion materials is reflected by the reflection-type polarization beam splitter plate back to the wavelength conversion materials, and is scattered by the phosphor material to become non-polarized light. The scattered light in the output direction is split by the polarization beam splitter again so that 50% of this light is output. This process repeats. This way, the energy of the output polarized light from the polarization beam splitter (i.e. the output of the light source) is increased, without significantly increasing the size of the output light spot.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a polarization conversion method in a polarized light source device, which includes: providing a polarization conversion device comprising a moveable carrier which carries one or more wavelength conversion materials; directing an excitation light from a light emitting element onto the moveable carrier of the polarization conversion device, wherein a size of a light spot of the excitation light illuminating on the moveable carrier is smaller than a size of the moveable carrier, and wherein different segments of the moveable carrier are alternately illuminated by the light spot of the excitation light; directing a converted light generated by the wavelength conversion materials as an output light of the polarized light source device; and providing a stationary reflection-type polarization beam splitting device fixedly disposed adjacent the moveable carrier on an output side, wherein the reflection-type polarization beam splitting device transmits a portion of the converted light generated by the wavelength conversion materials to produce the output light and reflects another portion of the converted light back to the wavelength conversion materials.

More specifically, the polarization conversion device includes a rotating wheel, a moving plate or a rotating cylinder. The wavelength conversion material includes phosphor, dyes, nano light emitting materials or the like. The wavelength conversion material may be mixed into a gel and adhered to one side of the moveable carrier which may be a transparent material. Alternatively, the wavelength conversion material may be sandwiched between the moveable carrier and a transparent film. The transparent film or moveable carrier may be coated with anti-reflection films. The polarization beam splitting device includes a reflective-type polarization beam splitter plate. The size (area) of the polarization beam splitter plate is smaller than the size of the moveable carrier and slightly larger than the size of the light spot of the excitation light. The distance between the polarization beam splitter plate and the moveable carrier is smaller than about 20% of a diameter of a bounding circle of the excitation light spot.

The polarization conversion method further includes: providing a filter on a side of the moveable carrier opposite the polarization beam splitter, to reflect the converted light form the wavelength conversion material and transmit the excitation light form the light emitting element. The distance between the filter and the moveable carrier is smaller than about 20% of a diameter of a bounding circle of the excitation light spot.

In another aspect, the present invention provides a polarization conversion device, which includes: a stationary member; a moveable carrier moveably disposed relative to the stationary member, the moveable carrier being made of a transparent material and carrying one or more wavelength conversion materials; and a reflective-type polarization beam splitting device fixedly disposed on the stationary member adjacent the moveable carrier.

More specifically, the polarization beam splitting device is a reflective-type polarization beam splitter plate, an area of which being about 0.2 to 20% of the area of the moveable carrier. The polarization conversion device further includes a stationary filter disposed on the stationary member, the filter being adjacent a side of the moveable carrier opposite the polarization beam splitting device. The polarization beam splitting device or the filter is mounted on the stationary member by a mounting structure such as a clamp, and is spaced from the moveable carrier by a distance less than 0.6 mm. The mounting structure includes an adjustment structure for finely adjusting the distance between the polarization beam splitting device or the filter form the moveable carrier.

In another aspect, the present invention provides a polarized light source device, which includes a light emitting element and the above-described polarization conversion device. The polarization beam splitting device of the polarization conversion device is disposed adjacent the moveable carrier on the output side of the light source device. The light emitting element may be an LED.

In another aspect, the present invention provides a projection system which includes a light source device for alternatingly generating multiple monochromatic lights including red, green and blue lights; and a LCD or LCoS display, wherein the light source device includes the polarized light source devices described above.

In embodiments of the present invention, the wavelength conversion materials are carried on the moveable carrier, which solves problems caused by heat generating of the wavelength conversion materials, enhancing the life of the light source device. The light source devices use solid state light sources which, compared to UHP lamps, have longer life, are easier to control and are more environmentally friendly. The spot size of the output light is controlled by controlling the distance from the polarization beam splitter plate to the moveable carrier such as a rotating wheel; the brightness of the output polarized light can be increased by decreasing this distance. This increased the light generation efficiency of the projection system, reduces cost and makes it easy to implement.

It is to be understood that both the foregoing general description and the following detailed description are exemplary and explanatory and are intended to provide further explanation of the invention as claimed.

BRIEF DESCRIPTION OF THE DRAWINGS

In the various drawings, same or similar components are labeled with same or similar symbols.

DETAILED DESCRIPTION OF THE PREFERRED EMBODIMENTS

Embodiments of the present invention are described in more detail below with reference to the drawings.

Figure 2:
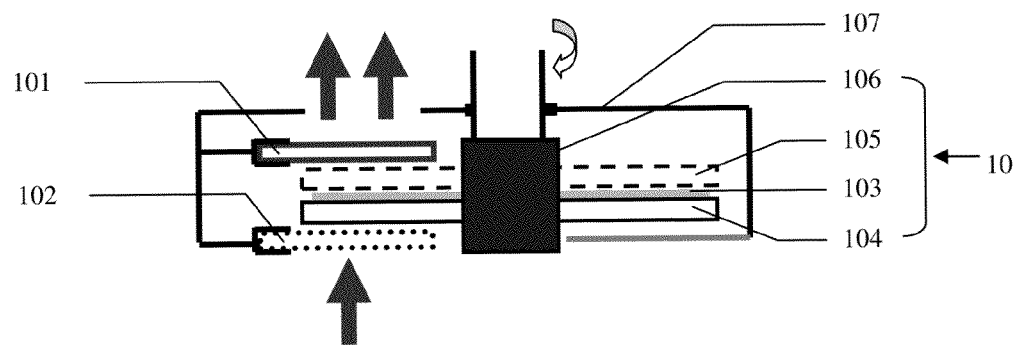
FIG. 2 schematically illustrates a polarization conversion device according to a first embodiment of the present invention which employs a rotating wheel.
Figure 3:
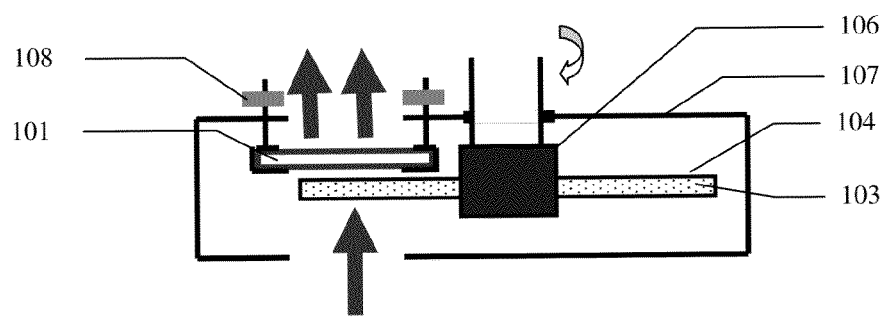
FIG. 3 schematically illustrates a polarization conversion device according to a second embodiment of the present invention which employs a rotating wheel.
Figure 5:
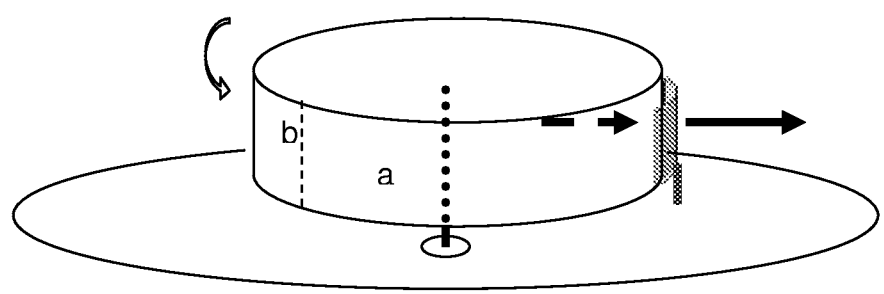
FIG. 5 schematically illustrates a polarization conversion device according to a third embodiment of the present invention which employs a rotating cylinder.
Figure 6:
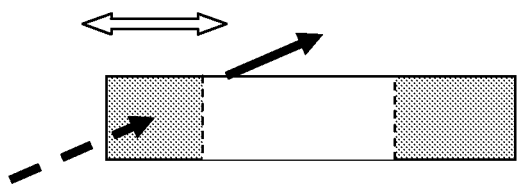
FIG. 6 illustrates a moving plate useful in a polarization conversion device according to a fourth embodiment of the present invention.

As described earlier, a conventional wavelength conversion method for a light source uses a polarization beam splitter and a half-wave plate to convert the polarization of the output light. To improve upon the conventional technology, embodiments of the present invention provide the following polarization conversion method:

Providing a polarization conversion device, which includes a moveable carrier carrying one or more wavelength conversion material and is in a moving state. The moveable carrier may be a rotating wheel (as shown in FIGS. 2 and 3), a rotating cylinder (as shown in FIG. 5), or a moving plate (as shown in FIG. 6). In these figures, the open arrows depict the direction of movement of the moveable carrier. The wavelength conversion material may be phosphors, luminescent dyes, quantum dots, or nano light emitting materials, etc.

Directing an excitation light from a light emitting element to the polarization conversion device. The size of the light spot of the excitation light on the moveable carrier is smaller than the size of the moveable carrier, so that different segments of the moveable carrier are alternatingly illuminated by the spot of the excitation light.

Outputting the converted light generated by the wavelength conversion materials as output light of the polarized light source device.

Providing a stationary reflection-type polarization beam splitting device adjacent the moveable carrier on the output side of the polarized light source device. The polarization beam splitting device transmits a part of the converted light from the wavelength conversion material as the output light of the polarized light source device, and reflects another part of the converted light back to the wavelength conversion material. This way, as the light reflected from the reflection-type polarization beam splitting device is scattered by the wavelength conversion materials, the polarization state of the light is randomized (i.e. the scatter light is substantially non-polarized), so that about 50% of such light will be transmitted by the polarization beam splitting device and outputted as the output light. This method increases the energy of the output polarized light. Because the polarizing beam splitting device does not move with the moveable carrier, it is possible to use a polarizing beam splitting device having a size (area) smaller than the size (area) of the moveable carrier. To reduce cost and simplify the structure of the polarized light source device, it is desirable to use a reflective-type polarization beam splitter plate as the polarization beam splitting device, where the size of the plate is slightly larger than the excitation light spot. In the embodiments described below, unless otherwise stated, the polarization beam splitting device is a reflective-type polarization beam splitter plate.

FIG. 2 is cross-sectional view illustrating a polarization conversion device according to a first embodiment of the present invention. The polarization conversion device includes a stationary member 107 and a rotating device 10. The rotating device 10 includes a moveable carrier 104 which moves relative to the stationary member 107. The moveable carrier 104 is made of a transparent material and carries one or more wavelength conversion materials 103. The stationary member 107 may be a cover or housing for the rotating device 10, and a rotational shaft 106 of the rotating device is rotatably mounted on the stationary member 107 via bearings or the like. The wavelength conversion materials 103 may be mixed into a gel and adhered to one side of the moveable carrier 104. Alternatively, the wavelength conversion materials 103 may be sandwiched between the moveable carrier 104 and a transparent plate 105 (shown in dashed lines), such as a low cost glass. One or both sides of the transparent plate 105 and/or the moveable carrier 104 may be coated with an anti-reflection (AR) coating which is familiar to those skilled in the relevant art.

Figure 1:
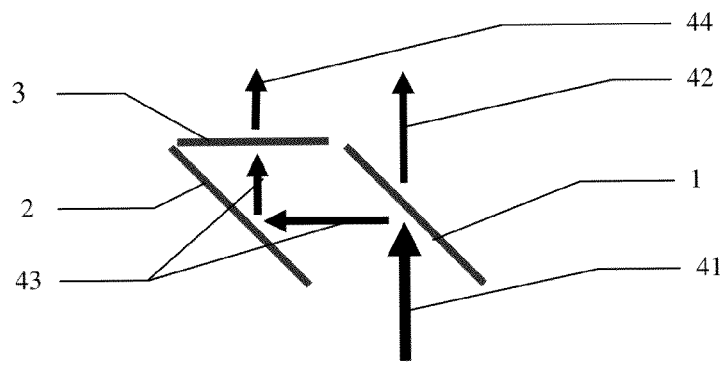
FIG. 1 schematically illustrates a conventional polarization conversion method.

In this embodiment, the polarization conversion device includes a stationary polarization beam splitter 101 fixed on the stationary member 107 and disposed adjacent the moveable carrier 104. The size of the polarization beam splitter 101 is smaller than the size of the moveable carrier 104. As the light spot of the excitation light is typically about 0.2 percent to 20 percent of the size of the moveable carrier, the size of the polarization bean splitter can be as small as about 0.2 percent to 20 percent of the area of the moveable carrier 104. The polarization beam splitter 101 functions in the same way as the polarization beam splitter 1 in FIG. 1 as described above.

In the embodiment of FIG. 2, the polarization conversion device may further include a stationary filter 102 disposed adjacent the moveable carrier 104 on a side opposite the polarization beam splitter 101. The filter 102 reflects the converted light from the wavelength conversion material 103 and transmits the excitation light from the light emitting element. The filter 102 is mounted on the stationary member 107, and the distance between the filter 102 and the moveable carrier 104 should be as small as possible. Preferably, to reduce cost, the shape and size of the filter 102 are approximately the same as those of the polarization beam splitter plate 101.

The polarization beam splitter plate 101 or the filter 102 shown in FIG. 2 is fixed onto the stationary member 107 by a clamp or other suitable devices.

FIG. 3 shows a polarization conversion device according to a second embodiment of the present invention. In this embodiment, the wavelength conversion materials 103 are mixed into the transparent material that forms the moveable carrier 104. For example, the moveable carrier 104 may be a glass substrate with phosphor powders mixed therein, forming a sufficiently strong moving body.

Figure 4:
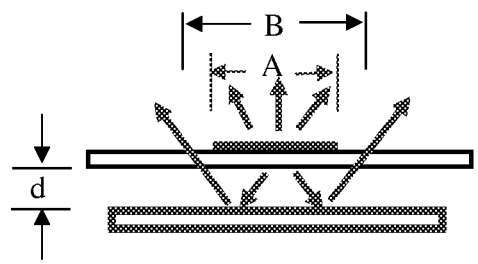
FIG. 4 illustrates the effect of the distance between the rotating wheel and the polarization beam splitter plate on the size of the output light spot in embodiments of the present invention.

As it is desirable to reduce the size of the polarization beam splitter 101 as much as possible to reduce cost, the distance between the polarization beam splitter 101 or the filter 102 and the moveable carrier 104 should be accurately controlled, especially when the light spot of the excitation light on the moveable carrier 104 is very small. Referring to FIG. 4, where d represents the distance between an optical component (the polarization beam splitter 101 or the filter 102) and the moveable carrier above the optical component. If the optical component represents the filter, then after the filter reflects the converted light back to the moveable carrier, the size of the light spot on the moveable carrier increases from its original size A to an expanded size B. If the optical component represents the polarization beam splitter, then after the polarization beam splitter reflects the unused excitation light and a part of the converted light back to the moveable carrier, the size of the excitation light spot on the moveable carrier is changed from its original size A to an expanded size B. In both cases, the larger the distance d, the larger the expanded size B, and therefore the lower the brightness of the output light of the polarization conversion device. To maintain a small light spot size as much as possible, the distance between the polarization beam splitter 101 or filter 102 and the moveable carrier 104 should be as small as possible, preferably less than 20% of the diameter of the bounding circle of the original light spot.

As shown in FIG. 3, the mounting structure that mounts the polarization beam splitter 101 to the stationary member 107 may include a position adjustment structure 108 for adjusting the distance d between the polarization beam splitter 101 and the moveable carrier 104. Although FIG. 3 does not show a filter, a filter similar to the filter 102 shown in FIG. 2 may be provided in this embodiment, along with its own position adjustment structure. For an original light spot size of 4 mm square, the distance between the polarization beam splitter or the filter and the moveable carrier is preferably less than 0.6 mm.

The polarization conversion device according to embodiments of the present invention, such as those shown in FIG. 2 and FIG. 3, may be employed in a polarized light source device having a light emitting element. It can reduce the cost of the polarized light source device to approximately the cost of non-polarized light source devices. In such a polarized light source device, the polarization beam splitter is disposed adjacent the moveable carrier 104 on the output side. The light emitting element may be a solid state light source such as a light emitting diode (LED).

As demonstrated by experiments, when generating a white light using a blue LED as the light emitting element and a rotating wheel carrying yellow phosphors, if no polarization conversion is carried out, the output polarized light flux in any direction is only about 52% of the total flux of the light source device. When a polarization conversion device according to the above embodiments is used, the polarized light flux in the same direction is increase by 20%.

As described earlier, t rotatable cylinder may be employed in lieu of the rotatable color wheel as the moveable carrier in the polarization conversion device according to embodiments of the present invention. In the example shown in FIG. 5, the cylindrical sidewall of the hollow rotatable cylinder (where the open arrow indicates the direction of rotation) includes at least two segments a and b. Each segment carries a different wavelength conversion material or no wavelength conversion material, so that the different segments have different wavelength conversion characteristics. A light emitting element (not shown) is disposed inside the rotatable cylinder. A polarization beam splitter is disposed outside the rotatable cylinder adjacent the exterior surface of the cylindrical sidewall. The size of the polarization beam splitter can be much smaller than the size of the cylindrical sidewall or the area of the segments carrying the wavelength conversion material. In an alternative embodiment, the sidewall of the rotatable cylinder is not segmented, and carries one wavelength conversion material or a mixture of more than one wavelength conversion materials. Similarly, a linearly moveable plate having multiple segments may be employed in lieu of the rotatable color wheel as the moveable carrier in the polarization conversion device, as shown in FIG. 6. The polarization conversion device used with the linearly moveable plate may be provided similarly to those shown in FIGS. 2 and 3, with suitable modifications for the position and control of the relevant components, as will be apparent to those skilled in the art and is not described in detail here.

A typical LCD or LCoS projection system includes a light source device that alternatingly provides multiple monochromatic lights such as red, green and blue lights. The polarized light source devices according to embodiments of the present invention may be used for such projection systems, resulting in a simplified light source structure and increased light efficiency of the system.

It will be apparent to those skilled in the art that various modification and variations can be made in the polarization conversion method and apparatus of the present invention without departing from the spirit or scope of the invention. Thus, it is intended that the present invention cover modifications and variations that come within the scope of the appended claims and their equivalents.

What is claimed is:

1. A polarization conversion method for a polarized light source device, comprising:
providing a polarization conversion device comprising a moveable carrier which carries one or more wavelength conversion materials;
directing an excitation light from a light emitting element onto the moveable carrier of the polarization conversion device, wherein a size of a light spot of the excitation light illuminating on the moveable carrier is smaller than a size of the moveable carrier, and wherein different segments of the moveable carrier are alternately illuminated by the light spot of the excitation light;
directing a converted light generated by the wavelength conversion materials as an output light of the polarized light source device; and
providing a stationary reflection-type polarization beam splitting device fixedly disposed adjacent the moveable carrier on an output side, wherein the reflection-type polarization beam splitting device transmits a portion of the converted light generated by the wavelength conversion materials to produce the output light and reflects another portion of the converted light back to the wavelength conversion materials, wherein the reflection-type polarization beam splitting device is a reflection-type polarization beam splitter plate, and wherein the polarization beam splitter plate has a size smaller than the size of the moveable carrier and larger than the size of the light spot of the excitation light.

2. The method of claim 1, where a distance between the polarization beam splitter plate and the moveable carrier is less than 20 percent of a diameter of a bounding circle of the excitation light spot on the moveable carrier.

3. The method of claim 1, wherein the moveable carrier is a rotatable wheel, a moveable plate or a rotatable cylinder.

4. The method of claim 1, wherein the wavelength conversion materials are phosphors, luminescent dyes, quantum dots, or nano light emitting materials.

5. The method of claim 1, wherein the wavelength conversion material is mixed into a gel and adhered to one side of the moveable carrier, and wherein the moveable carrier is made of a transparent material.

6. The method of claim 1, wherein the wavelength conversion material is sandwiched between the moveable carrier and a transparent film.

7. The method of claim 6, further comprising coating an anti-reflection film on the transparent film or the moveable carrier.

8. The method of claim 1, further comprising:
providing a stationary filter fixedly disposed adjacent the moveable carrier on a side opposite the polarization beam splitting device, the filter reflecting the converted light generated by the wavelength conversion materials and transmitting the excitation light from the light emitting element.

9. The method of claim 8, wherein a distance between the filter and the moveable carrier is less than 20 percent of a diameter of a bounding circle of the excitation light spot on the moveable carrier.

10. A polarization conversion device comprising:
a stationary member;
a moveable carrier moveably disposed relative to the stationary member, the moveable carrier being made of a transparent material and carrying one or more wavelength conversion materials; and
a reflective-type polarization beam splitting device fixedly disposed on the stationary member adjacent the moveable carrier, wherein the reflection-type polarization beam splitting device is a reflection-type polarization beam splitter plate, and wherein a size of the polarization beam splitter plate is about 0.2 percent to 20 percent of a size of the moveable carrier.

11. The polarization conversion device of claim 10, wherein the moveable carrier is a rotatable wheel, a moveable plate or a rotatable cylinder.

12. The polarization conversion device of claim 10, wherein the wavelength conversion materials are phosphors, luminescent dyes, quantum dots, or nano light emitting materials.

13. The polarization conversion device of claim 10, further comprising:
a filter fixedly disposed on the stationary member adjacent the moveable carrier on a side opposite the reflection-type polarization beam splitting device.

14. The polarization conversion device of claim 13, further comprising a mounting structure for fixing the reflection-type polarization beam splitting device or the filter onto the stationary member.

15. The polarization conversion device of claim 14, wherein the mounting structure includes an adjusting structure for adjusting a distance between the reflection-type polarization beam splitting device or the filter and the moveable carrier.

16. The polarization conversion device of claim 13, wherein a distance between the reflection-type polarization beam splitting device or the filter and the moveable carrier is less than about 0.6 mm.

17. A polarized light source device comprising:
a light emitting element; and
a polarization conversion device comprising:
   a stationary member;
   a moveable carrier moveably disposed relative to the stationary member, the moveable carrier being made of a transparent material and carrying one or more wavelength conversion materials; and
   a reflection-type polarization beam splitting device fixedly disposed on the stationary member adjacent the moveable carrier on an output side of the polarized light source device, wherein the reflection-type polarization beam splitting device is a reflection-type polarization beam splitter plate, and wherein a size of the polarization beam splitter plate is about 0.2 percent to 20 percent of a size of the moveable carrier.

18. The polarized light source device of claim 17, wherein the polarization conversion device further comprises:
   a filter fixedly disposed on the stationary member adjacent the moveable carrier on a side opposite the reflection-type polarization beam splitting device.

19. The polarized light source device of claim 18, wherein the polarization conversion device further comprises:
   a mounting structure for fixing the reflection-type polarization beam splitting device or the filter onto the stationary member.

20. The polarized light source device of claim 18, wherein a distance between the reflection-type polarization beam splitting device or the filter and the moveable carrier is less than about 0.6 mm.

21. The polarized light source device of claim 17, wherein the light emitting element is a light emitting diode (LED).

22. A projection system comprising:
a light source for alternatingly providing multiple monochromatic lights including red, green and blue lights; and
a LCD or LCoS device for projecting the multiple lights;
wherein the light source device comprises:
a light emitting element; and
a polarization conversion device comprising:
   a stationary member;
   a moveable carrier moveably disposed relative to the stationary member, the moveable carrier being made of a transparent material and carrying one or more wavelength conversion materials;
   a reflection-type polarization beam splitting device fixedly disposed on the stationary member adjacent the moveable carrier on an output side of the light source device; and
   a filter fixedly disposed on the stationary member adjacent the moveable carrier on a side opposite the reflection-type polarization beam splitting device, having a size approximately equal to a size of the reflection-type polarization beam splitting device.

23. The projection system of claim 22, wherein the reflection-type polarization beam splitting device is a reflection-type polarization beam splitter plate, and wherein a size of the polarization beam splitter plate or the filter is about 0.2 percent to 20 percent of a size of the moveable carrier.

24. The projection system of claim 22, wherein the reflection-type polarization beam splitting device is a reflection-type polarization beam splitter plate, and wherein a distance between the reflection-type polarization beam splitter plate or the filter and the moveable carrier is less than about 0.6 mm.

* * * * *